United States Patent Office 3,353,131
Patented Nov. 14, 1967

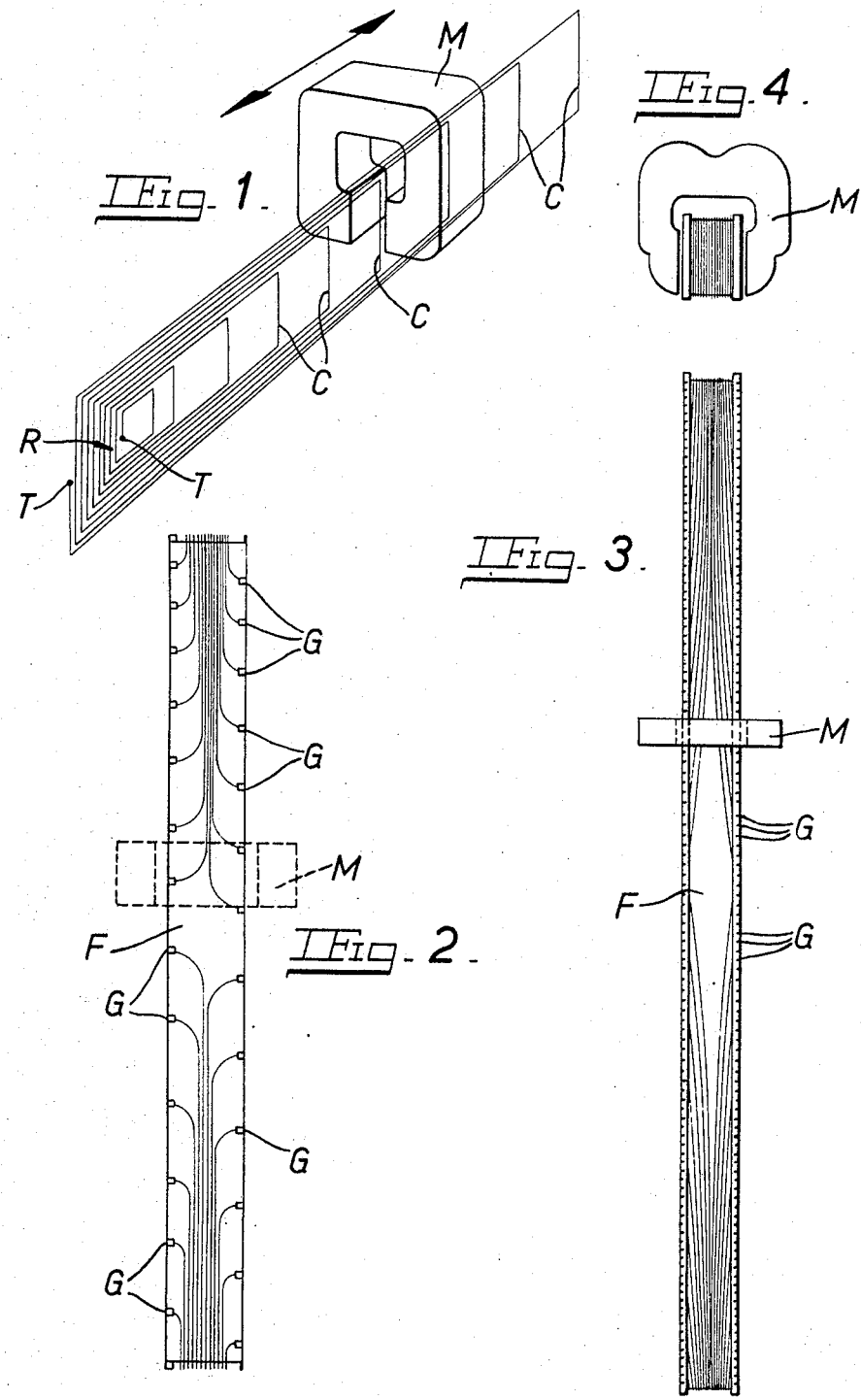

3,353,131
ELECTROMECHANICAL LINEAR VELOCITY TRANSDUCER
Peter W. R. Stubbs, Coventry, Ronald V. Woodward, Solihull, and Charles Ollerenshaw, Shirley, England, assignors to The Rover Company Limited, Solihull, Warwickshire, England, a company of Great Britain
Filed Aug. 19, 1966, Ser. No. 573,675
Claims priority, application Great Britain, Aug. 21, 1965, 35,963/65
7 Claims. (Cl. 336—130)

This invention relates to electromechanical velocity transducers for producing an electrical signal, the magnitude of which is dependent on the velocity of a relative linear mechanical movement between two parts. This result can be achieved by differentiating the signal from a straight-forward displacement transducer but such a method introduces errors and transducers are therefore known in which the velocity signal is produced electrically by a form of linear electric motor, i.e. an arrangement in which the lines of force of a magnetic field are arranged to cut a series of turns of a coil or coils. In one example a U-shaped yoke has coils, connected in series, wound on its two limbs and is mounted on the one part whilst the other part carries a bar magnet that moves between the limbs in a direction parallel to the direction in which the limbs extend, the axis of the magnet being at right angles to the direction of motion. As the magnet moves, the closed magnetic circuit formed by the bar magnet and that part of the armature which forms the closed end of the U, cuts successive turns of the coils.

The inevitable hysteresis in the ferro-magnetic material of the yoke results in the poles that are induced in its limbs opposite to the poles of the bar magnet lagging behind the movement of the bar magnet, with the consequence that distortion is introduced, especially when the direction of movement is reversed, at which time there is a brief period of zero output. This results, for example, in a sinusoidal movement producing a signal that has a short horizontal portion in its waveform every time the signal passes through zero.

With the layout described above it is impossible to overcome the difficulty by eliminating the ferromagnetic yoke, since its absence would mean that the lines of force from the magnet would cut every coil turn twice and would induce no net electrical signal. It is an aim of the invention to overcome this difficulty by providing a layout that requires no ferro-magnetic material on the part carrying the coils, and that consequently avoids the hysteresis trouble referred to above.

According to the invention we now propose an electromechanical linear velocity transducer comprising an array of electrical conductors spaced apart, preferably uniformly, along a line parallel to the direction of relative movement, each conductor extending in a direction transverse to the direction of movement and all of the conductors being substantially parallel to each other and being connected together so that they all feed signals of a common sign generated in them to an output circuit; this array of conductors is associated with one of the two members between which the relative velocity of movement is to be measured, and secured to the other member there is a magnetic circuit having an air gap through which the conductors successively pass.

The magnetic circuit can be formed by a horseshoe permanent magnet, or it could be an electromagnet. The cutting of the lines of force results in a potential difference being generated across the ends of each conductor of a magnitude proportional to the velocity of relative movement.

Preferably all the conductors are joined in series and, as they must be joined by leads which are clear of the magnetic field to avoid the generation in these leads of signals counteracting those to be detected, a preferred way of doing this is to form the conductors as portions of turns of a multi-turn coil. The turns of the coil lie in planes containing the direction of relative movement and each successive turn is longer, in that direction, than the preceding one so that portions of the successive turns are spaced apart along the direction of movement, and other portions of the turns are all bunched together clear of the field.

The invention will now be further described by way of example with reference to the accompanying drawings, in which:

FIGURE 1 is an isometric view illustrating the invention diagrammatically;

FIGURE 2 is a plan view of a more practical form of the invention, but still illustrated diagrammatically; and FIGURES 3 and 4 are respectively a plan view and an end view of a practical embodiment of the invention.

The basic idea behind the invention is simply the application of the laws of electromagnetic induction, by which, if a conductor is moved through a magnetic field in a direction transverse to its own length and transverse to the lines of force of the field, an electromotive force is generated in the conductor, its magnitude being proportional to the rate of cutting of the lines of force, i.e. to the rate of movement. To form a transducer capable of giving an output signal proportional to velocity over a substantial length of movement we arrange a row of such conductors in a line along the direction of movement and connect them togethre to give a common output. So that the signal is uniform at all positions for a given velocity we space them evenly. In the embodiment illustrated in FIGURE 1 the conductors, shown at C, form portions of successive turns of a coil, each turn being rectangular and each being longer (by the amount of the pitch between the conductors C) than the preceding turn. Thus all the conductors are in series and the return portions R of the turns are bunched together. This coil is mounted on one of the members between which the relative velocity of movement is to be measured and the electrical output appearing across terminals TT is used in any desired manner as a measure of the velocity of relative movement. The other member carries a horseshoe permanent magnet M having as narrow an air gap as possible to give maximum flux and therefore maximum signal, the minimum gap being determined by considerations of working clearance and tolerances.

It will be understood that the working range of the instrument is limited to the length of travel covered by the conductors C. If the magnet M were to pass over the return portions R of the coil this would produce across the terminals TT a large signal of the opposite sign. In practice one ensures that the travel never approaches even near portions R, since even the cutting, by these portions, of the slight stray field that is well outside the air gap of the magnet will introduce an error in the signal generated in the portions C.

In the embodiment illustrated in FIGURE 1 the turns all lie in a common plane and this makes it suitable for the coil to be formed as a printed circuit, as well as allowing the air gap to be very small, but the practical maximum length is limited by the number of conductors that can be accommodated side by side in the direction of movement. As the number of turns increases, there comes a point where the bunch of conductors becomes so large that the "window" of the magnet M has to be increased in size, making the magnet of lower flux.

To overcome this limitation we can double the effective length for a given size of magnet by using two coils end to end and connecting them in series. Furthermore we wind the coils, made of fine wire, on an elongated bobbin or former and locate the portions C in grooves in the side face of the former. Then, in order to make the effective pitch between successive conductors C half the minimum practical pitch between the grooves, we dispose alternate conductors C on alternate side faces of the former, the grooves on opposite faces being appropriately staggered by a distance equal to half the groove pitch. This is all illustrated in FIGURE 2 where the former is seen at F, and the grooves in the two side faces at G. It will be appreciated that the conductors C encountered successively by the magnet in the direction of relative movement need not be portions of successive turns of the coil, as all the turns are in series and can be in any order. It will also be appreciated that at any given instant there will be several conductors C in the air gap of the magnet, all producing E.M.F.'s of the same sign, which add together to produce the output at the terminals TT.

The practical form shown in FIGURES 3 and 4 is basically the same as that of FIGURE 2 but the grooves are much closer together and the number of turns greater. In one example there are 8 grooves per inch on each side, giving a conductor spacing of 16 per inch and this gave, with a suitable magnet, a voltage output of 1 millivolt per inch per second of velocity. By using still closer spacing and making the former less wide, allowing thereby a shorter air gap and higher magnetic flux density, a sensitivity ten times this is not difficult to achieve.

Modifications are possible. For example the magnet could be an electromagnet. In one possible modification the conductors C, instead of being portions of successive turns of a coil, could simply extend in parallel between a pair of busbars, like the rungs of a ladder, but then each would need to incorporate a rectifier to prevent the voltage generated in those conductors that are in the magnetic field being short-circuited by those that are clear of it, or the layout would have to incorporate some form of linear commutator for the same reason, with all its attendant potential troubles of intermittent or variable-resistance contact.

We claim:

1. An electromechanical linear velocity transducer comprising an array in the form of a plurality of electrical conductors, said conductors being spaced apart along a line parallel to the direction in which relative movement is to occur, each of said conductors extending transversely to said direction, means connecting all of said conductors in the same electrical sense, a pair of output terminals, said means connecting said conductors across said output terminals, a magnetic circuit having an air gap, said array of conductors and said magnetic circuit being relatively movable in said direction along a line such that said conductors pass successively through said air gap on occurrence of relative movement.

2. The transducer set forth in claim 1, wherein said conductors are uniformly spaced apart.

3. The transducer set forth in claim 1, wherein said connecting means comprise the turns of a multi-turn coil, each of said conductors forming a portion of one of said turns, and the coil having two ends connected respectively to said two terminals.

4. An electromechanical linear velocity transducer comprising a magnetic circuit having an air gap across which a magnetic field is present, and a multi-turn coil, said coil having successive turns of different sizes, each turn having a signal-generating portion and a return portion, the return portions of all of said turns being bunched together, whereas the signal-generating portions are spaced apart along a line extending away from said bunched together return portions, said line extending through said air-gap, and each of said signal-generating portions extending transverse to said line and at the same time transverse to the magnetic field in said air-gap.

5. The transducer set forth in claim 4 wherein said signal-generating portions are uniformly spaced apart.

6. An electromechanical linear velocity transducer comprising a magnetic circuit having an air gap across which a magnetic field is generated, an elongated former of non-magnetic material, said former being disposed to extend through said air gap, and said former and magnetic circuit being relatively displaceable along a line parallel to the direction in which said former extends, said former having first and second side faces, said side faces having their planes perpendicular to the direction of the lines of force of said magnetic field, a plurality of grooves in at least one of said side faces, said grooves each extending in a direction perpendicular to said line of relative displacement, and a multi-turn coil, said coil being wound on said former with its axis extending parallel to the direction of said magnetic field, successive turns of said coil having different sizes and each turn comprising a signal-generating portion and a return portion parallel to said signal-generating portion, said portions being joined by longitudinal portions and each of said signal-generating portions lying in an associated one of said grooves whereas said return portions are displaced at a region spaced away along the length of said former from said signal-generating portions.

7. The transducer set forth in claim 6, wherein said grooves with signal-generating portions therein are disposed on both of said side faces of said former, the grooves on one of said side faces being intermediate those on the other side face.

References Cited

UNITED STATES PATENTS 2,905,914    9/1959    Proskauer _____ 336—117

LEWIS H. MYERS, *Primary Examiner.*

T. J. KOZMA, *Assistant Examiner.*